(12) United States Patent
Munakata et al.

(10) Patent No.: US 7,184,163 B2
(45) Date of Patent: Feb. 27, 2007

(54) IMAGE FORMING SYSTEM

(75) Inventors: Takashi Munakata, Toyokawa (JP);
Takashi Onishi, Toyohashi (JP);
Yoshihiro Ichi, Aichi-Ken (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 11/206,055

(22) Filed: Aug. 18, 2005

(65) Prior Publication Data
US 2006/0033955 A1 Feb. 16, 2006

Related U.S. Application Data

(62) Division of application No. 09/526,177, filed on Mar. 15, 2000.

(30) Foreign Application Priority Data
Mar. 16, 1999 (JP) ................................. 11-070383

(51) Int. Cl.
*G06F 3/12* (2006.01)
*G06K 15/00* (2006.01)
(52) U.S. Cl. ..................................... 358/1.15; 358/1.14
(58) Field of Classification Search ............... 358/1.15, 358/1.14, 1.13, 1.17, 1.2, 1.1, 401, 402, 403, 358/498
See application file for complete search history.

(56) References Cited

U.S. PATENT DOCUMENTS

| 5,358,238 | A | 10/1994 | Mandel et al. |
| 5,823,529 | A | 10/1998 | Mandel et al. |
| 5,991,516 | A | 11/1999 | Desmond et al. |
| RE37,031 | E | 1/2001 | Nishiwaki |
| 6,292,267 | B1 | 9/2001 | Mori et al. |
| 6,456,386 | B1 | 9/2002 | Watanabe et al. |

FOREIGN PATENT DOCUMENTS

| JP | 07-291520 | 11/1995 |
| JP | 08-133579 | 5/1996 |

*Primary Examiner*—Douglas Q. Tran
(74) *Attorney, Agent, or Firm*—McDermott Will & Emery LLP

(57) ABSTRACT

Disclosed is a printer capable of being connected with a plurality of personal computers and having a plurality of paper ejection trays. The printer further comprises a plurality of display units respectively corresponding to the paper ejection trays. In a case where a two or more paper ejection trays are occupied by sheets which are ejected in response to at least one ejection instruction from same personal computer, the controller of the printer controls the display units to notify a user that the sheets are ejected to a plurality of paper.

5 Claims, 6 Drawing Sheets

IMAGE FORMING SYSTEM

CROSS-REFERENCE TO THE RELATED APPLICATIONS

This application is a divisional of U.S. application Ser. No. 09/526,177 filed on Mar. 15, 2000, which is based on Japanese Patent Application No. 11-070383 filed on Mar. 16, 1999, the content of which is hereby incorporated by reference.

BACKGROUND OF THE INVENTION

1. Field of the Invention

The present invention relates to an image forming apparatus capable of being connected to a plurality of external apparatuses such as personal computers or work stations, performing image formation based on data sent from the external apparatuses, and having a plurality of paper ejection trays for receiving image-formed sheets thereon.

2. Description of the Related Art

Among image forming apparatuses such as printers, facsimiles, and so on being connected to external apparatuses such as network-connected personal computers (hereinafter, sometimes referred to as PCs) and performing image formation based on output instructions (print instructions) from the external apparatuses, one having a plurality of paper ejection trays for receiving image-formed sheets has conventionally been known. An image forming apparatus of this type displays information on the completion of paper ejection on a display panel disposed in the vicinity of the operation panel of the image forming apparatus or on the monitors of PCs which are external apparatuses.

However, in such a conventional image forming apparatus displaying information on the completion of paper ejection only on the display panel in the vicinity of the operation panel of the main unit of the image forming apparatus or on the monitors of the PCs, it is difficult to recognize the completion information at a position other than in the vicinity of the operation panel of the main unit of the image forming apparatus or at the monitors of the PCs, for example, at the location of the paper ejection unit. Particularly, in a case where the display panel of the main unit of the image forming apparatus or the monitor of the PC is away from the paper ejection unit (paper ejection trays), when sheets are ejected into a plurality of paper ejection trays in response to an ejection instruction from the same PC, in which paper ejection trays the sheets ejected in response to the user's instruction are present cannot be conspicuously shown to the user.

OBJECTS AND SUMMARY OF THE INVENTION

The present invention is made to solve the above-mentioned problems, and a principal object thereof is to provide an improved image forming apparatus.

Another object of the present invention is to provide an image forming apparatus where completion information can be easily recognized even at the location of the paper ejection unit disposed away from the vicinity of the operation unit of the main unit of the image forming apparatus or the monitor of the PC.

Yet another object of the present invention is to provide an image forming apparatus where the user can easily take out his or her ejected sheets even when sheets are ejected into a plurality of paper ejection trays in response to one ejection instruction from the same PC.

To achieve at least one of the above-mentioned objects, an image forming apparatus according to an aspect of the present invention capable of being connected to a plurality of external apparatuses and performing image formation based on data sent from the external apparatuses is provided with: a plurality of paper ejection trays for receiving image-formed sheets thereon; and a notification unit disposed on the paper ejection trays or in the vicinity of the paper ejection trays and when sheets ejected into a plurality of paper ejection trays in response to at least one ejection instruction from the same external apparatus are present, notifying a user that the sheets are ejected in response to an ejection instruction from the same external apparatus.

In this structure, since the notification unit is disposed on the paper ejection trays or in the vicinity of the paper ejection trays, the user can easily recognize completion information even at the location of the paper ejection unit. Moreover, even when sheets are ejected into a plurality of paper ejection trays in response to at least one ejection instruction from the same external apparatus, the user can be notified of the sheets ejected in response to an ejection instruction from the same external apparatus by use of the notification unit disposed on the paper ejection trays or in the vicinity of the paper ejection trays, so that in which paper ejection trays the sheets ejected in response to the user's instruction(s) are present can be conspicuously shown to the user.

Moreover, a function to send the content of notification by the notification unit to the external apparatus that sent the ejection instruction may be provided. This enables the user using the external apparatus to be previously informed of the content of notification by the notification unit disposed on the paper ejection trays or in the vicinity of the paper ejection trays. Consequently, based on the previously provided information (the content of notification), the user can identify the paper ejection trays where his or her ejected sheets are present.

An image forming apparatus according to another aspect of the present invention capable of being connected to a plurality of external apparatuses and performing image formation based on data sent from the external apparatuses is provided with: a plurality of paper ejection trays for receiving image-formed sheets thereon; and notification unit for notifying a user of a paper ejection tray in which a last ejected sheet is present.

In this structure, the user can be notified of the paper ejection tray in which the last ejected sheet is present. Consequently, for example, even when sheets are ejected into a plurality of paper ejection trays in response to at least one ejection instruction from the same external apparatus, the user can be urged to take out the last ejected sheet.

An image forming apparatus according to yet another aspect of the present invention capable of being connected to a plurality of external apparatuses and performing image formation based on data sent from the external apparatuses is provided with: a plurality of paper ejection trays for receiving image-formed sheets thereon; a control unit for, when the number of sheets which an external apparatus instructs the image forming apparatus to eject exceeds a holding capacity of one paper ejection tray, continuously ejecting overflowing sheets into another paper ejection tray; and a notification unit for notifying a user of paper ejection trays where the sheets ejected by the control unit are present.

In this structure, even when the number of sheets which an external apparatus instructed the image forming apparatus to eject exceeds the holding capacity of one paper ejection tray and the overflowing sheets are continuously ejected into the next paper ejection tray, the user can be notified of the paper ejection trays in which the continuously ejected sheets are present.

Moreover, as the notification unit, a display elements respectively provided in correspondence with each paper ejection trays may be used. This enables the location of the paper ejection trays to be indicated in an intuitive manner.

BRIEF DESCRIPTION OF DRAWINGS

These and other objects, advantages and features of the invention will become apparent from the following description thereof taken in conjunction with the accompanying drawings in which.

DETAILED DESCRIPTION OF THE PREFERRED EMBODIMENTS

Preferred embodiments of an image forming apparatus according to the present invention will hereinafter be described with reference to the drawings.

Figure 1:
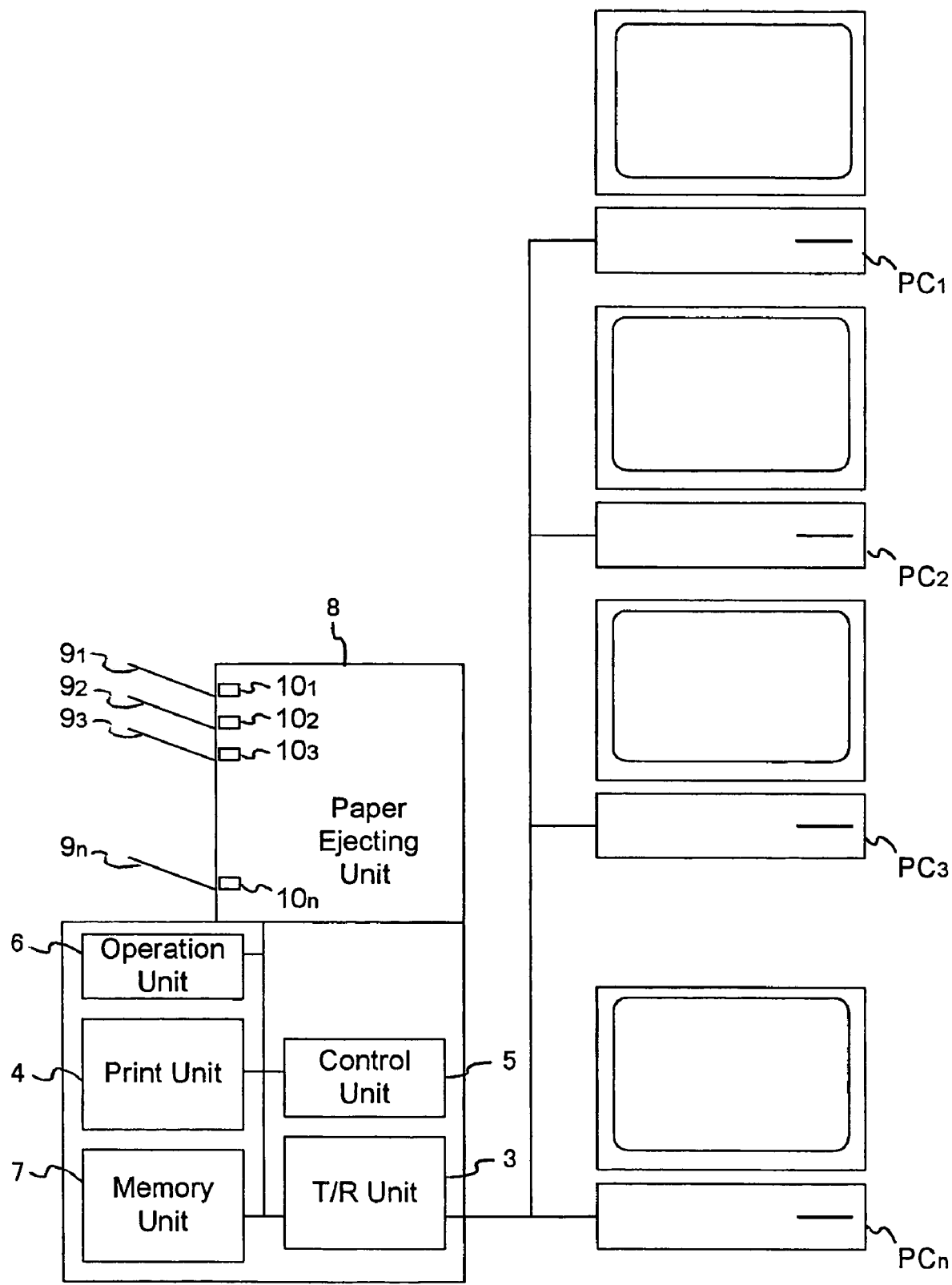
FIG. 1 shows the general structure of a network including a printer according to a first embodiment of the present invention.

FIG. 1 shows the general structure of a network including a network printer (hereinafter, referred to simply as printer) according to a first embodiment of the present invention. A plurality of personal computers PC ($PC_1$ to $PC_n$) which are the external apparatuses and a printer 1 which is the image forming apparatus are connected. The printer 1 is provided with: a sending/receiving unit 3 for receiving print data from the personal computers PC and sending various messages to the personal computers PC; a print unit 4 such as a laser printer for performing image formations on sheets of paper; a control unit 5 for controlling the entire printer 1; an operation unit 6 including a touch panel for providing the printer main unit with instructions, and a display for showing various pieces of information; a memory unit 7 for storing data such as image data to be output; and a paper ejection unit 8 for receiving ejected image-output sheets thereon. The paper ejection unit 8 includes a plurality of paper ejection trays 9 ($9_1$, $9_2$, $9_3$, . . . , $9_n$) for assorting image-formed sheets, and paper ejection information display units 10 ($10_1$, $10_2$, $10_3$, . . . , $10_n$) for displaying the paper ejection conditions in the paper ejection trays 9. The display units 10 are electrically connected with the control unit 5, and thus controlled by the control unit 5.

Figure 2:
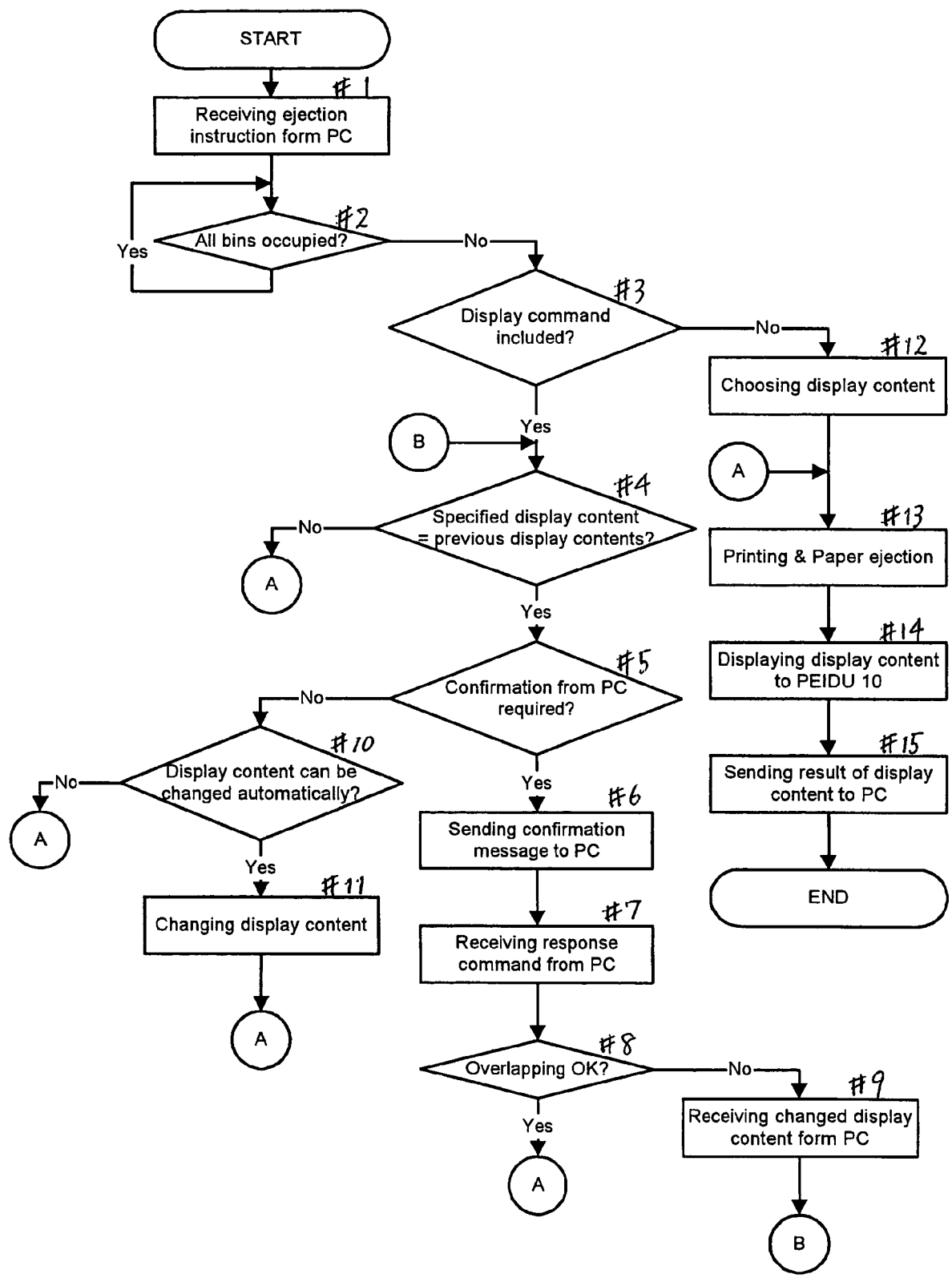
FIG. 2 is a flowchart of control of the printer shown in FIG. 1.
Figure 3:
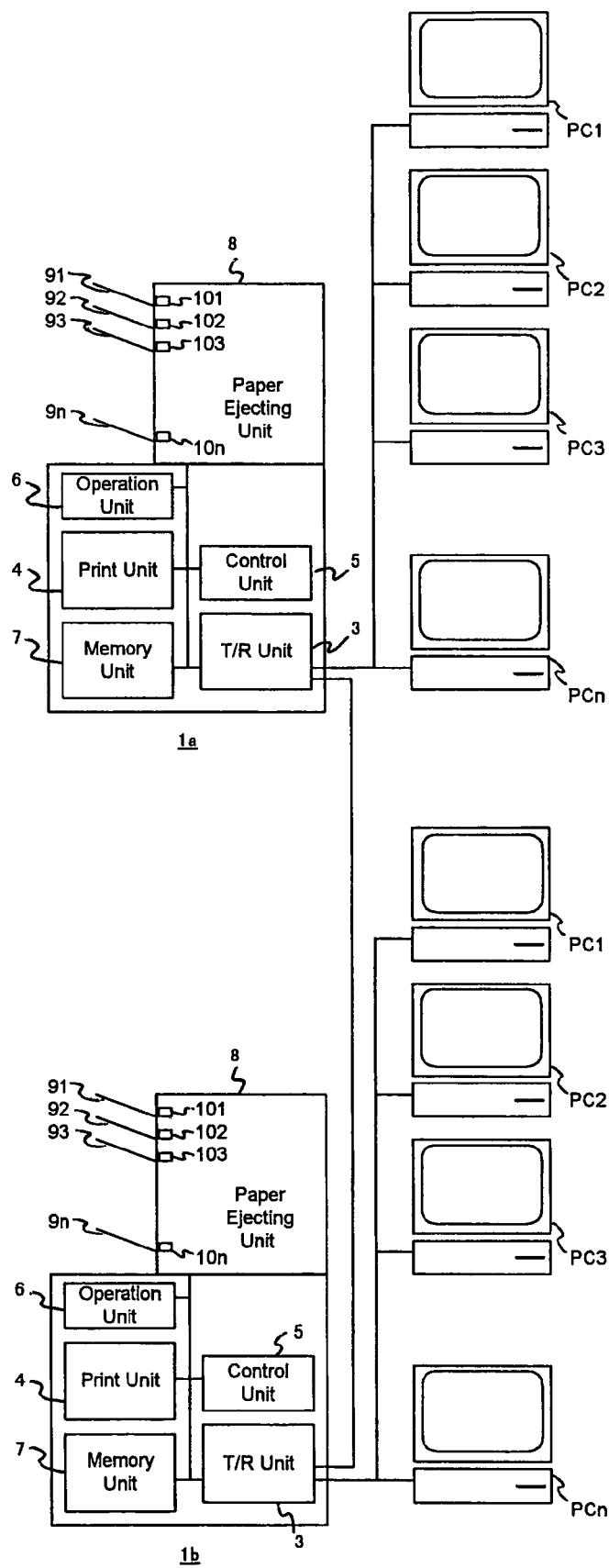
FIG. 3 shows the general structure of a network including a printer according to a second embodiment of the present invention.

Control of the printer 1 having the above-described structure will be described with reference to FIG. 2. In the first embodiment, when sheets ejected in response to ejection instructions from the same personal computer PC are present in a plurality of paper ejection trays 9, the same content is shown on the paper ejection information display units 10 that are corresponding to the paper ejection trays 9 occupied by sheets ejected in response to ejection instructions from the same personal computer PC. By showing the same content, the user is informed that sheets ejected in response to ejection instructions from the same personal computer PC are held in the paper ejection trays 9.

When receiving an ejection instruction from a personal computer PC (#1), the control unit 5 waits until any of the paper ejection trays 9 of the paper ejection unit 8 becomes empty (#2). In the flows, trays are referred to as bins. This will apply hereafter. When any of the paper ejection trays 9 becomes empty (#2: NO), it is determined whether or not the ejection instruction command from the personal computer PC includes an instruction (specification) on the content to be displayed on the paper ejection information display unit 10 (#3). When such an instruction is included (#3: YES), it is determined whether or not the specified content to be displayed overlaps with a previously specified content (#4). When it overlaps (#4: YES), it is determined whether or not the initial setting is such that when the contents to be displayed overlap, the printer 1 requests confirmation from the personal computer PC that sent the ejection instruction (#5).

When the setting is such that the printer 1 requests confirmation from the personal computer PC (#5: YES), the control unit 5 sends a message for confirmation to the personal computer PC that sent the ejection instruction (#6), and receives a response command from the personal computer PC (#7). When the response command from the personal computer PC confirms the specified content to be displayed, that is, the content overlapping with the content displayed on another paper ejection information display unit 10 (#8: YES), paper ejection into the paper ejection tray 9 is performed (#13), and then, the content overlapping with the content displayed on another paper ejection information display unit 10 is displayed on the paper ejection information display unit 10 corresponding to the paper ejection tray 9 (#14). Then, the result of the display is sent to the personal computer PC (#15), and the content displayed on the paper ejection information display unit 10 is shown on the monitor of the personal computer PC.

On the other hand, when it is determined at #8 that the response command from the personal computer PC provides an instruction to change the content to be displayed (#8: NO), an instruction on a changed content to be displayed is received from the personal computer PC (#9), and the processing from #4 is repeated. With this processing, even when sheets ejected in response to an ejection instruction from the same personal computer PC are present in a plurality of paper ejection trays 9, in a case where there is an instruction from the personal computer PC, it can be indicated that the sheets were ejected in response to an ejection instruction from the same personal computer PC by displaying the same content on the paper ejection information display units 10 corresponding to the paper ejection trays 9.

When it is determined at #5 that the initial setting is not such that the printer 1 requests confirmation from the personal computer PC that sent the ejection instruction when the contents to be displayed overlap (#5: NO), the control unit 5 determines whether or not the setting is such that the content to be displayed on the paper ejection information display unit 10 is automatically changed to a content not overlapping with the content displayed on another paper ejection information display unit 10 (#10). When the setting is not such that the content is changed (#10: NO), the processing from #13 is performed to display the content overlapping with the content displayed on another paper ejection information display unit 10, on the paper ejection information display unit 10 corresponding to the paper ejection tray 9 into which paper ejection was performed. In this case, when sheets are ejected into a plurality of paper ejection trays 9 in response to ejection instruction from the same personal computer PC, the same content specified by the personal computer PC can also be displayed on the paper ejection information display units 10 corresponding to the paper ejection trays 9, so that it can be indicated that the sheets were ejected in response to an ejection instruction from the same personal computer PC. When it is determined at #10 that the setting is such that the content to be displayed is automatically changed to a content not overlapping with the content displayed on another paper ejection information display unit 10 (#10: YES), the content to be displayed is changed to the not overlapping content (#11), and then, the processing from #13 is performed.

When it is determined at #3 that the ejection instruction command from the personal computer PC does not include an instruction on the content to be displayed on a paper ejection information display unit 10 (#3: NO), the control unit 5 automatically chooses a content not overlapping with the content displayed on another paper ejection information display unit 10 (#12), and paper ejection into the paper ejection tray 9 is performed (#13). Then, the content chosen at #12 is displayed on the paper ejection information display unit 10 corresponding to the paper ejection tray 9 (#14), and the result of the display is sent to the personal computer PC (#15) and is shown on the monitor of the personal computer PC. When it is determined at #4 that the specified content to be displayed does not overlap with the content displayed on another paper ejection information display unit 10 (#4: NO), the processing from #13 is performed.

According to the first embodiment, since the paper ejection information display units 10 are disposed in the vicinity of the paper ejection trays, the user can easily recognize the completion of paper ejection even at a position other than in front of the operation unit 6 or in front of the monitor of the personal computer PC. Moreover, even when sheets ejected in response to a plurality of ejection instructions from the same personal computer PC are present in a plurality of paper ejection trays 9, it can be indicated that the sheets were ejected in response to the ejection instructions from the same personal computer PC by displaying the same content on the paper ejection information display units 10 corresponding to the paper ejection trays 9. In addition, the content displayed on the paper ejection information display units 10 can be sent to the personal computer PC that sent the ejection instruction so that the user of the personal computer PC is informed of the content. Consequently, the user can easily identify the paper ejection trays 9 in which his or her ejected sheets are present.

Next, the general structure and control of a network including a printer 1 according to a second embodiment will be described with reference to FIGS. 3 to 6. In the second embodiment, when there are not enough empty paper ejection trays left in the printer 1 in continuously ejecting sheets into a plurality of paper ejection trays 9 in response to an instruction from the same personal computer PC, empty paper ejection trays of another printer are used for the ejection, and the same content is automatically displayed on the paper ejection information display units 10 corresponding to the paper ejection units of the two printers to indicate that the sheets were ejected in response to an ejection instruction from the same personal computer PC.

The network system according to the second embodiment includes a plurality of network-connected printers 1*a* and 1*b*, and a plurality of personal computers PC (PC$_1$ to PC$_n$) connected to the printers 1*a* and 1*b*. The printers 1*a* and 1*b* have a similar structure to the printer 1 of the first embodiment. When a necessary number of paper ejection trays 9 for ejecting therein the number of sheets specified by the personal computers PC connected to one printer are not left in the printer, the overflowing sheets are output into paper ejection trays 9 of another printer.

Figure 4:
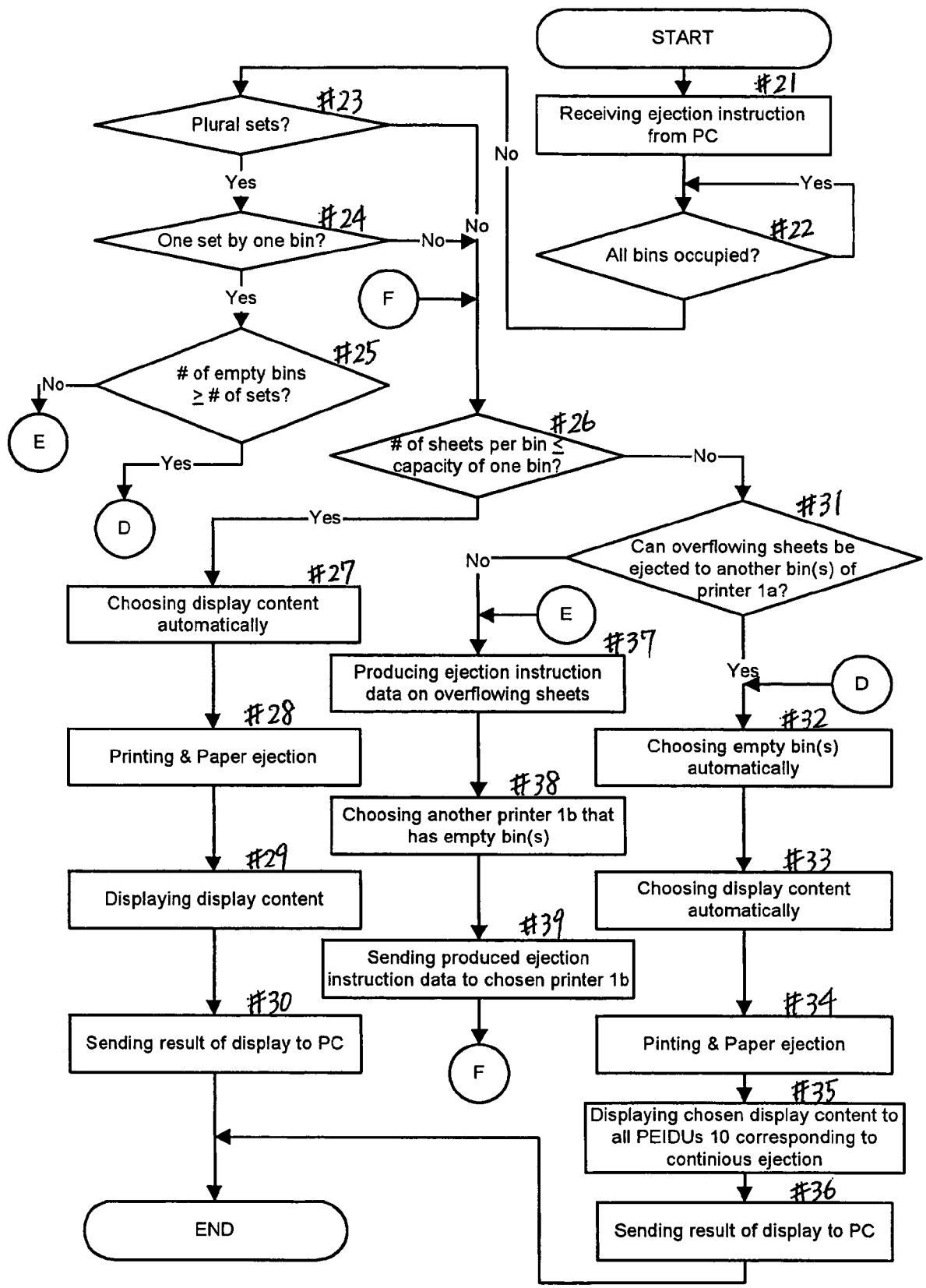
FIGS. 4 through 6 are flowcharts of control of the printers shown in FIG. 3.

Referring to FIG. 4, when receiving an ejection instruction from a personal computer PC (#21), the control unit 5 of the printer 1*a* waits until any of the paper ejection trays 9 of the paper ejection device 8 becomes empty (#22), and starts paper ejection. When the personal computer PC instructs the printer 1*a* to eject a plurality of sets of prints (#23: YES), it is determined whether or not the sets are ejected so that one set is ejected into one paper ejection tray 9 (#24). When the sets are ejected so that one set is ejected into one paper ejection tray 9 (#24: YES), the control unit 5 of the printer 1*a* determines whether or not all of the specified number of sets can be ejected into the empty paper ejection trays 9 of the printer 1*a* (#25). When it is determined that all the sets can be ejected into the empty paper ejection trays 9 of the printer 1*a* (#25: YES), a plurality of empty paper ejection trays 9 of the printer 1*a* are automatically chosen (#32), and a content not overlapping with the contents displayed on the other paper ejection information display units 10 is automatically chosen as the display indicating the completion of the paper ejection into the paper ejection trays 9 (#33). Then, the control unit 5 of the printer 1*a* performs continuous ejection into the paper ejection trays 9 chosen at #32 (#34), displays the content chosen at #33 on all of the paper ejection information display units 10 corresponding to the paper ejection trays 9 into which the ejection was performed (#35), and sends the result of the display to the personal computer PC that sent the ejection instruction (#36).

On the other hand, when the control unit 5 of the printer 1*a* determines that it is impossible to eject all of the specified number of sets into the empty paper ejection trays 9 of the printer 1*a* (#25: NO), the process proceeds to #37 to produce ejection instruction data on the overflowing sheets that cannot be ejected into the paper ejection trays 9 of the printer 1*a* (#37). Then, another printer 1*b* with empty paper ejection trays 9 is automatically chosen (#38), and the ejection instruction data produced at #37 is sent to the printer 1*b* (#39) to ask the printer 1*b* to eject the overflowing sheets that cannot be ejected into the paper ejection trays 9 of the printer 1*a*. Then, the process proceeds to #26, where the control unit 5 of the printer 1*a* ejects the sheets that can be ejected into the paper ejection trays 9 of the printer 1*a*. Specifically, it is determined whether or not the number of ejected sheets per paper ejection tray 9 is not more than the maximum holding capacity of one paper ejection tray 9 (#26). When it is not more than the maximum holding capacity (#26: YES), a content not overlapping with the contents displayed on the other paper ejection information display units 10 is automatically chosen as the display indicating the completion of the paper ejection into the paper ejection trays 9 (#27). Then, the sheets are ejected into the paper ejection trays 9 (#28), the content chosen at #27 is displayed on the paper ejection information display units 10 corresponding to the paper ejection trays 9 into which the sheets were ejected (#29), and the result of the display is sent to the personal computer PC that sent the ejection instruction (#30). When it is determined at #26 that the number of ejected sheets per paper ejection tray 9 exceeds the maximum holding capacity of one paper ejection tray 9 (#26: NO), the control unit 5 of the printer 1*a* determines whether or not the overflowing sheets can be ejected into another empty paper ejection tray(s) 9 of the printer 1*a* (#31). When it is determined that the overflowing sheets can be ejected (#31: YES), the processing from #32 to #36 is performed to continuously eject the sheets into the paper ejection tray 9 of the printer 1a. When it is determined that the overflowing sheets cannot be ejected (#31: NO), the processing from #37 to #39 is performed to ask another printer 1b to eject the sheets.

Figure 5:
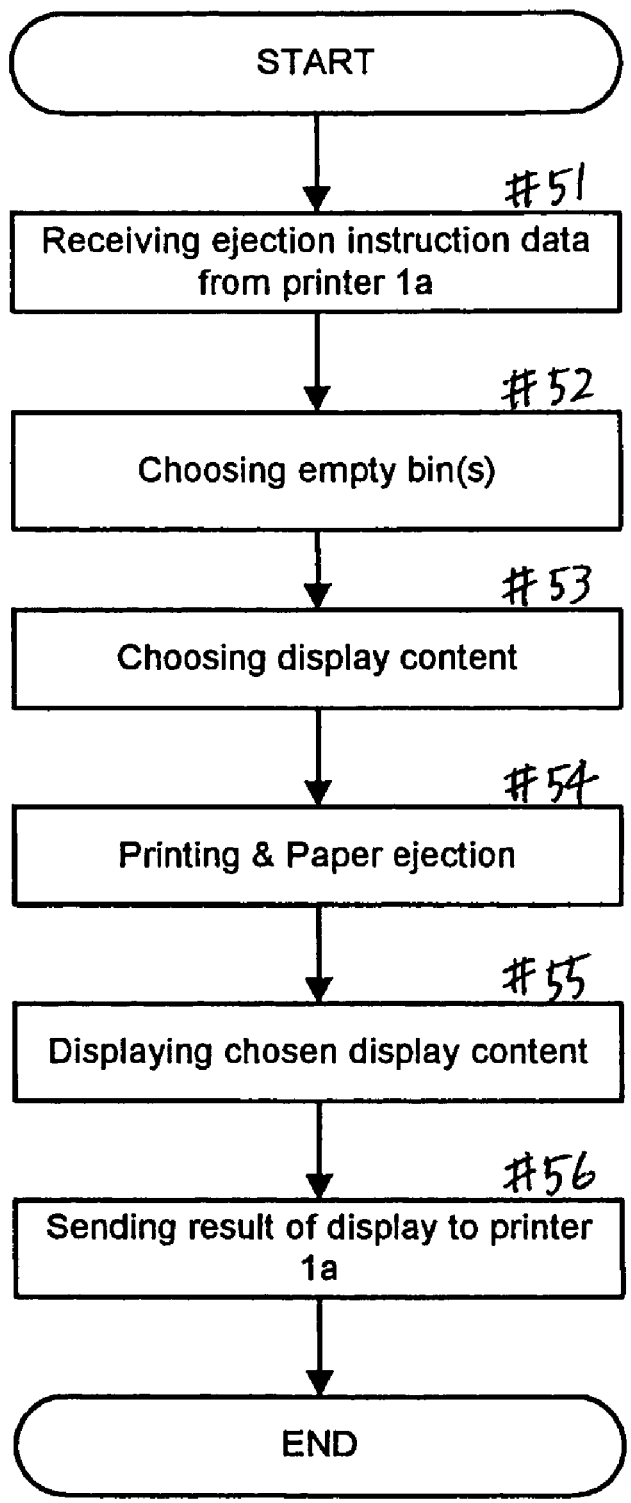

Next, processing performed by the printer 1b having received the ejection instruction data sent from the printer 1a at #39 will be described with reference to FIG. 5. When receiving the ejection instruction data from the printer 1a (#51), the control unit 5 of the printer 1b automatically chooses empty paper ejection trays 9 of the printer 1b (#52), and chooses the content displayed on the paper ejection information display units 10 of the printer 1a, as the paper ejection completion display of the printer 1b (#53). Then, paper ejection is continued into the paper ejection trays 9 chosen at #52 (#54), the content displayed on the paper ejection information display units 10 of the printer 1a is displayed on all of the paper ejection information display units 10 corresponding to the paper ejection trays 9 into which paper ejection was performed (#55), and the result of the display is sent to the printer 1a that sent the ejection instruction data at #39 (#56).

Figure 6:
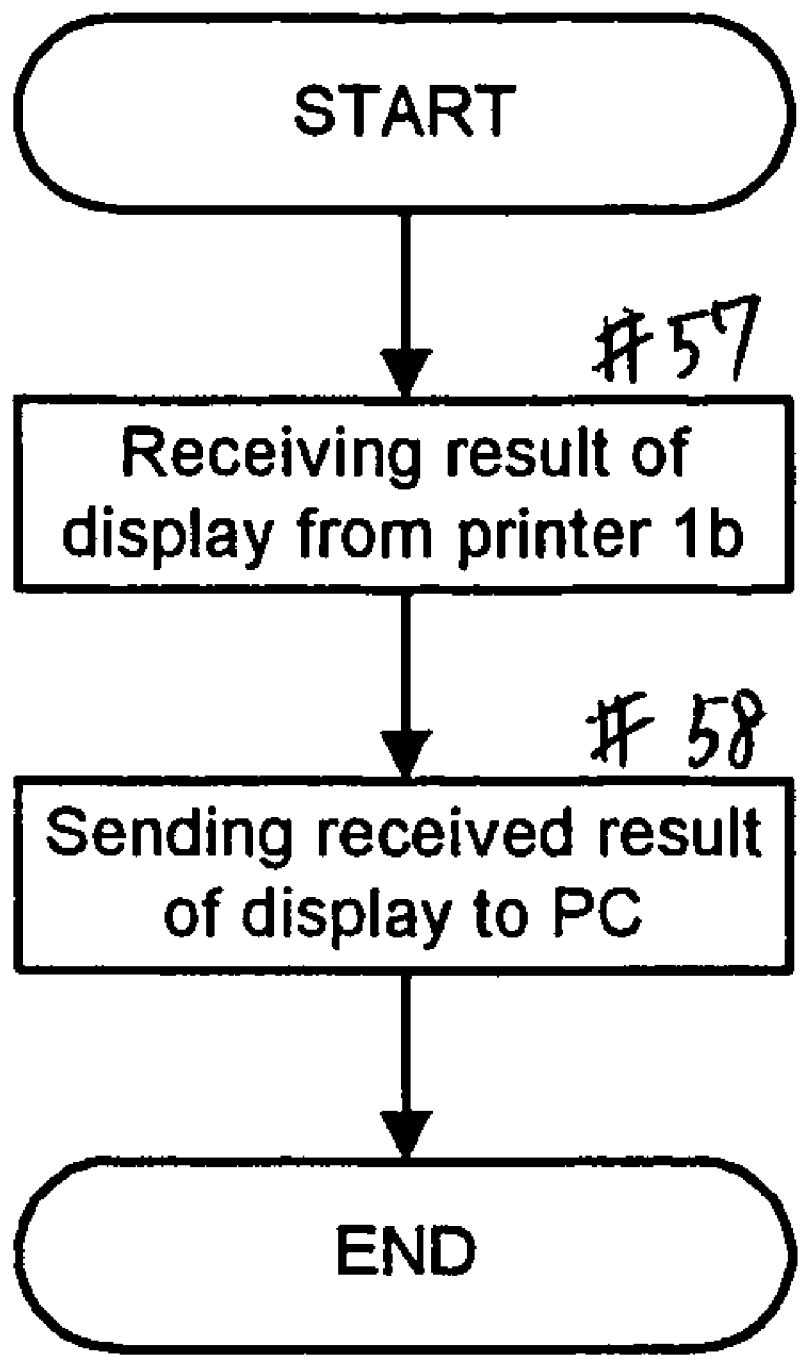

Next, processing performed by the printer 1a having received the result of the display sent from the printer 1b at #56 will be described with reference to FIG. 6. When receiving the result of the display from the printer 1b asked to eject the sheets (#57), the control unit 5 of the printer 1a sends the received display result to the personal computer PC that sent the ejection instruction (#58), and the received display result is displayed on the personal computer PC.

When it is determined at #23 that the number of sets specified by the personal computer PC is one (#23: NO) or when it is determined at #24 that a plurality of sets are collectively ejected into one paper ejection tray 9 (#24: NO), the processing from #26 is performed.

As described above, according to the second embodiment, when continuous ejection into a plurality of paper ejection trays 9 is performed in response to an ejection instruction from the same personal computer PC, continuous ejection can be performed by use of empty paper ejection trays 9 of the printer 1a to which the ejection instruction was sent and another printer 1b. In addition, by displaying the same content on the paper ejection information display units 10 corresponding to the paper ejection trays 9 into which paper ejection was performed, it can be indicated that the sheets were ejected in response to an ejection instruction from the same personal computer PC. Consequently, the user can easily identify the paper ejection trays 9 in which his or her ejected sheets are present even when continuous ejection is performed.

As the paper ejection information display units 10 in the first and the second embodiments, the following may be used: ones that provide display with the color emitted by any of a plurality of light emitting diodes (LEDs) each emitting a peculiar color; ones that provide display with a mixture of the colors emitted by three LEDs that emit red (R), green (G) and blue (B), respectively; ones that provide display with the color emitted by one LED capable of display with three colors R, G and B and mixtures of these colors; ones that provide display with the color emitted by one liquid crystal display (LCD) capable of display with three colors R, G and B and mixtures of these colors; and ones that provide display with one LCD capable of display of letters. By any of these methods, the location of the paper ejection trays 9 can be conspicuously shown by use of the LCD or the LED serving as the display device, so that the user can easily identify his or her ejected sheets.

The present invention is not limited to the above-described embodiments but various modifications are possible. For example, while in the second embodiment, the same content is displayed on all of a plurality of paper ejection information display units 10 corresponding to the paper ejection trays 9 into which continuous ejection is to be performed, the last paper ejection tray may be enabled to be identified by changing the display manner of the paper ejection information display unit, corresponding to the last paper ejection tray, of the paper ejection information display units corresponding to the paper ejection trays into which continuous ejection is to be performed (hereinafter, referred to as "last paper ejection information display unit"). Specifically, the display on the last paper ejection information display unit of the paper ejection information display units corresponding to the paper ejection trays into which continuous ejection is to be performed is blinked, and the displays on the other display units are lit up. As another example, the display on the last paper ejection information display unit of the paper ejection information display units corresponding to the paper ejection trays into which continuous ejection is to be performed is made conspicuously bright, and the displays on the other display units are shown in normal brightness. Moreover, the following methods may also be used: the display on the last paper ejection information display unit is shown in a specific color; words indicating that the paper ejection tray corresponding to this display unit is the last paper ejection tray is shown on the last paper ejection information display unit; the times of ejection of all the paper ejection trays into which continuous ejection is to be performed are shown on the paper ejection information display units corresponding to the paper ejection trays; the numbers indicating the order of ejection are displayed for all the paper ejection trays into which continuous ejection is to be performed. Consequently, the user can be prevented from forgetting to take out the last ejected sheet even when continuous ejection is performed into a plurality of paper ejection trays.

As described above, according to the above-described embodiments, since the user can be notified of the sheets ejected in response to an ejection instruction from the same external apparatus by use of the notification unit disposed on the paper ejection trays or in the vicinity of the paper ejection trays, the user can easily recognize completion information even at the location of a paper ejection unit disposed at a position other than in the vicinity of the operation unit of the main unit of the image forming apparatus or at the monitor of an external apparatus, and even when sheets are ejected into a plurality of paper ejection trays in response to an ejection instruction from the same external apparatus, in which paper ejection trays the sheets ejected in response to the user's instruction are present can be conspicuously shown to the user. Consequently, the user can easily take out his or her ejected sheets.

Moreover, since the function to send the content of notification by the notification unit to the external apparatus that sent the ejection instruction is provided, the user of the external apparatus can be previously informed of the content of notification by the notification unit disposed on the paper ejection trays or in the vicinity of the paper ejection trays, so that even when sheets are ejected into a plurality of paper ejection trays in response to an ejection instruction from the same external apparatus, the user can easily identify the paper ejection trays where his or her ejected sheets are present.

Moreover, since the notification unit for notifying the user of the paper ejection tray where the last ejected sheet is present is provided, even when sheets are ejected into a plurality of paper ejection trays in response to an ejection instruction from the same external apparatus, the user can be prevented from forgetting to take out the last ejected sheet.

Moreover, since the user is notified of the paper ejection trays where continuously ejected sheets are present, even when the number of sheets which the external apparatus instructed the image forming apparatus to eject exceeds the holding capacity of one paper ejection tray and the overflowing sheets are continuously ejected into the next paper ejection tray, the user can easily take out his or her ejected sheets.

Moreover, by using a display device as the notification unit, the location of the paper ejection trays can be conspicuously shown, so that the user can easily take out his or her ejected sheets.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image forming system capable of being connected to a plurality of external apparatuses and performing image formations based on data sent from the external apparatuses, said image forming system comprising:
    a plurality of image forming apparatuses, each having a plurality of paper ejection trays for receiving sheets on which images are formed; and
    a control unit for, when a respective image forming apparatus receives an ejection instruction from one of the external apparatuses and the number of sheets required to execute said ejection instruction exceeds a capacity of an available one of said paper ejection trays of said respective image forming apparatus, ejecting a part of sheets to said available one of said paper ejection trays of said respective image forming apparatus and continuously ejecting the remaining sheets to another available one of said paper ejection trays of said respective image forming apparatus, and when said respective image forming apparatus receives said ejection instruction from one of the external apparatuses and the number of sheets required to execute said ejection instruction exceeds the capacity of available paper ejection trays of said respective image forming apparatus, ejecting a part of sheets to the available paper ejection trays of said respective image forming apparatus and continuously ejecting the remaining sheets to available paper ejection trays of another of one of the plurality of image forming apparatuses and for notifying a user of the paper ejection trays in the respective image forming apparatus and said another of one of the plurality of image apparatuses where the part of sheets and the remaining sheets are present.

2. The image forming system as claimed in claim 1, wherein said control unit includes a plurality of display units respectively provided in correspondence with each paper ejection tray.

3. An image forming system capable of being connected to a plurality of external apparatuses and performing image formations based on data sent from the external apparatuses, said image forming system comprising;
    a plurality of image forming apparatuses, each having a plurality of paper ejection trays for receiving sheets on which images are formed;
    a control unit for, when a respective image forming apparatus receives an ejection instruction from one of the external apparatuses and the number of sheets required to execute said ejection instruction exceeds a capacity of an available one of said paper ejection trays of said respective image forming apparatus, ejecting a part of sheets to said available one of said paper ejection trays of said respective image forming apparatus and continuously ejecting the remaining sheets to another available one of said paper ejection trays of said respective image forming apparatus, and when said respective image forming apparatus receives said ejection instruction from one of the external apparatuses and the number of sheets required to execute said ejection instruction exceeds the capacity of available paper ejection trays of said respective image forming apparatus, ejecting a part of sheets to the available paper ejection trays of said respective image forming apparatus and continuously ejecting the remaining sheets to available paper ejection trays of another of one of the plurality of image forming apparatuses and for notifying a user of the paper ejection tray of said another of one of the plurality of image forming apparatuses in which a last ejected sheet is present.

4. The image forming system as claimed in claim 3, further comprising a plurality of notifying units respectively disposed on the paper ejection trays or in the vicinity of the paper ejection trays, said control unit being connected with said plurality of notifying units.

5. The image forming system as claimed in claim 3 wherein said control unit further notifying the user where the part of sheets and the remaining sheets are present.

* * * * *